United States Patent
Akiyama (10) Patent No.: US 10,620,518 B2
(45) Date of Patent: Apr. 14, 2020

(54) LIGHT SOURCE DEVICE AND PROJECTOR

(71) Applicant: SEIKO EPSON CORPORATION, Tokyo (JP)

(72) Inventor: Koichi Akiyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/445,378

(22) Filed: Jun. 19, 2019

(65) Prior Publication Data
US 2019/0391474 A1 Dec. 26, 2019

(30) Foreign Application Priority Data
Jun. 20, 2018 (JP) .................................. 2018-116906

(51) Int. Cl.
*G03B 21/20* (2006.01)

(52) U.S. Cl.
CPC ......... *G03B 21/204* (2013.01); *G03B 21/208* (2013.01); *G03B 21/2013* (2013.01); *G03B 21/2066* (2013.01); *G03B 21/2073* (2013.01)

(58) Field of Classification Search
CPC .............. G03B 21/204; G03B 21/2073; G03B 21/2066; G03B 21/208; G03B 21/2013
See application file for complete search history.

(56) References Cited

U.S. PATENT DOCUMENTS

| | | | |
|---|---|---|---|
| 2011/0043762 A1* | 2/2011 | Miyamae | G03B 21/14 353/20 |
| 2011/0187999 A1* | 8/2011 | Hirata | G03B 21/14 353/20 |
| 2016/0353069 A1 | 12/2016 | Chikahisa | |
| 2017/0168379 A1* | 6/2017 | Hashizume | C03C 14/006 |
| 2018/0149954 A1* | 5/2018 | Akiyama | G03B 21/16 |
| 2018/0149955 A1* | 5/2018 | Akiyama | G02B 27/141 |
| 2018/0231881 A1* | 8/2018 | Akiyama | G03B 21/204 |
| 2019/0235369 A1* | 8/2019 | Janssens | G02B 26/008 |

FOREIGN PATENT DOCUMENTS

JP 2016-224304 A 12/2016
WO WO2018011059 * 1/2018 ............. G03B 21/20

* cited by examiner

*Primary Examiner* — Donald L Raleigh
(74) *Attorney, Agent, or Firm* — Oliff PLC (57) ABSTRACT

The disclosure relates to a light source device including a blue laser emitting element configured to emit a blue laser beam, a red laser emitting element configured to emit a red laser beam, a phosphor excited by the blue laser beam to generate yellow fluorescence, a combiner configured to combine the yellow fluorescence and a part of the blue laser beam with each other to generate composite light, a polarization conversion element disposed in a posterior stage of the combiner, and a mirror disposed at a light emission side of the polarization conversion element to reflect the red laser beam, wherein the mirror is located at a position failing to overlap the composite light emitted from the polarization conversion element.

20 Claims, 3 Drawing Sheets

LIGHT SOURCE DEVICE AND PROJECTOR

The present application is based on, and claims priority from JP Application Serial Number 2018-116906, filed Jun. 20, 2018, the disclosure of which is hereby incorporated by reference herein in its entirety.

BACKGROUND

1. Technical Field

The present disclosure relates to a light source device and a projector.

2. Related Art

In recent years, there is a technology of generating illumination light by combining a blue laser beam and yellow fluorescence generated by excitation with the blue laser beam with each other as a light source device used for a projector. Further, in JP-A-2016-224304, there is disclosed a light source device which combines yellow fluorescence, a blue laser beam and a red laser beam with each other to generate illumination light.

However, in the light source device described above, a mirror for combining the red laser beam with the yellow fluorescence is disposed at the light path of the yellow fluorescence. Therefore, there is a problem that the red component included in the yellow fluorescence is reflected by the mirror, and therefore, cannot efficiently be used, and thus, a light loss is caused.

SUMMARY

A light source device according to an aspect of the present disclosure includes a blue laser emitting element configured to emit a blue laser beam, a red laser emitting element configured to emit a red laser beam, a phosphor excited by the blue laser beam to generate yellow fluorescence, a combiner configured to combine the yellow fluorescence and a part of the blue laser beam with each other to generate composite light, a polarization conversion element disposed in a posterior stage of the combiner, and a mirror disposed at a light emission side of the polarization conversion element to reflect the red laser beam, wherein the mirror is located at a position failing to overlap the composite light emitted from the polarization conversion element.

The light source device according to the aspect described above may further include a first light homogenizer disposed between the combiner and the polarization conversion element, and a superimposing lens disposed at the light emission side of the polarization conversion element, wherein the red laser beam reflected by the mirror and the composite light may enter the superimposing lens.

The light source device according to the aspect described above may further include a second light homogenizer disposed between the red laser emitting element and the mirror.

In the light source device according to the aspect described above, the first light homogenizer may have a first lens integrator, the second light homogenizer may have a second lens integrator, the first lens integrator may have a first multi-lens and a second multi-lens, the second lens integrator may have a third multi-lens and a fourth multi-lens, and a first small lens constituting the first multi-lens and a third small lens constituting the third multi-lens may be similar in shape to each other.

In the light source device according to the aspect described above, a division number of lenses in the second lens integrator may be larger than a division number of lenses in the first lens integrator.

In the light source device according to the aspect described above, the polarization conversion element may have a polarization conversion area configured to convert light having entered the polarization conversion element into polarization component in a predetermined direction, and the mirror may be disposed outside the polarization conversion area in a state of a planar view of the polarization conversion element from a light axis direction.

A projector according to another aspect of the present disclosure includes the light source device according to the aspect described above, a light modulation device configured to modulate light from the light source device in accordance with image information to thereby form image light, and a projection optical system configured to project the image light.

DESCRIPTION OF AN EXEMPLARY EMBODIMENT

Hereinafter, an embodiment of the present disclosure will be described using the drawings.

Figure 1:
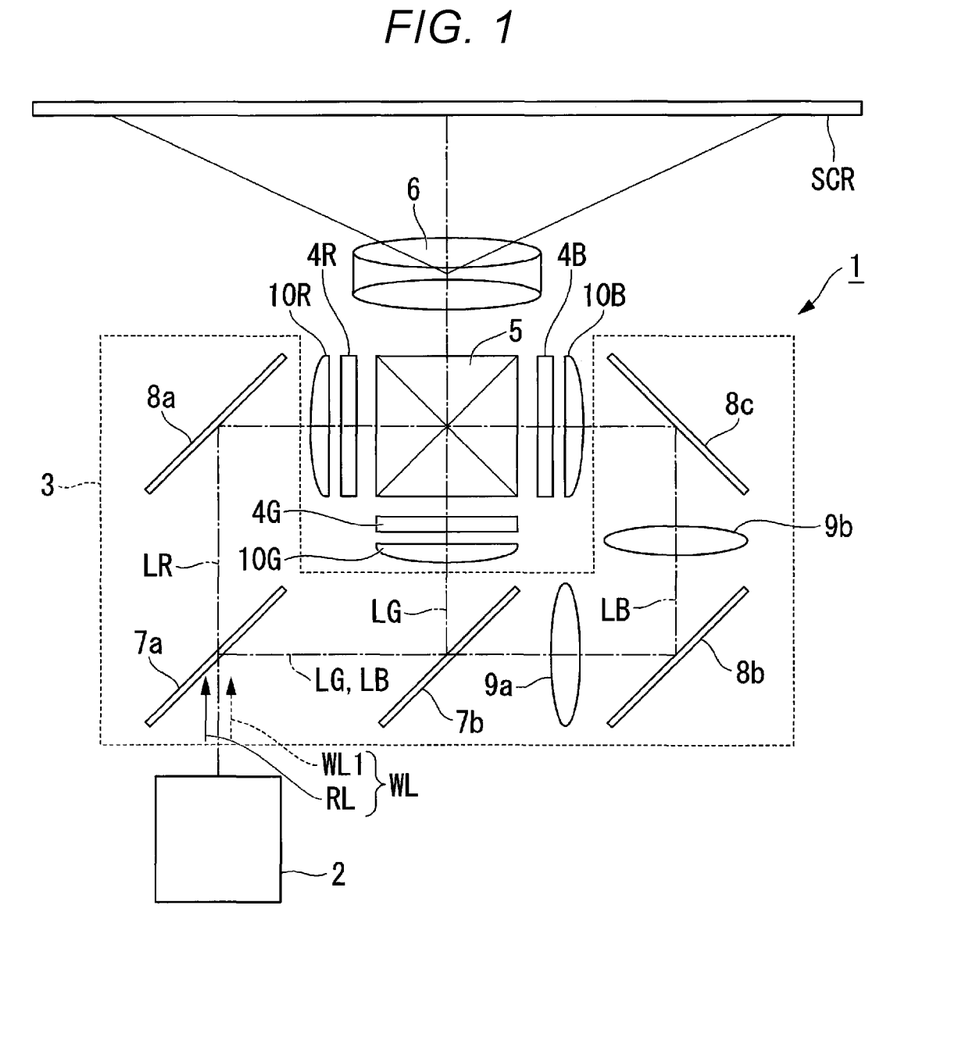
FIG. 1 is a schematic configuration diagram of a projector according to an embodiment.

FIG. 1 is a schematic configuration diagram of a projector according to the present embodiment.

As shown in FIG. 1, the projector 1 according to the present embodiment is a projection-type image display device for displaying a color image on a screen SCR. The projector 1 is provided with a light source device 2, a color separation optical system 3, a light modulation device 4R, a light modulation device 4G, a light modulation device 4B, a combining optical system 5, and a projection optical system 6.

The light source device 2 according to the present embodiment emits illumination light WL toward the color separation optical system 3. In the present embodiment, the illumination light WL includes composite light WL1 and supplementary light beam RL, and is white light as a whole.

The color separation optical system 3 separates the illumination light WL from the light source device 2 into red light LR (e.g., light in a wavelength band of 600 nm through 700 nm), green light LG (e.g., light in a wavelength band of 500 nm through 600 nm), and blue light LB (e.g., light in a wavelength band of 440 nm through 470 nm).

The color separation optical system 3 is generally provided with a first dichroic mirror 7a and a second dichroic mirror 7b, a first total reflection mirror 8a, a second total reflection mirror 8b and a third total reflection mirror 8c, and a first relay lens 9a and a second relay lens 9b.

The first dichroic mirror 7a separates the illumination light WL from the light source device 2 into the red light LR and the other light (the green light LG and the blue light LB). The first dichroic mirror 7a transmits the red light LR thus separated from, and at the same time reflects the rest of the light (the green light LG and the blue light LB). Meanwhile, the second dichroic mirror 7b reflects the green light LG and at the same time transmits the blue light LB to thereby separate the rest of the light into the green light LG and the blue light LB.

The first total reflection mirror 8a is disposed in the light path of the red light LR, and reflects the red light LR, which has been transmitted through the first dichroic mirror 7a, toward the light modulation device 4R. Meanwhile, the second total reflection mirror 8b and the third total reflection mirror 8c are disposed in the light path of the blue light LB to guide the blue light LB, which has been transmitted through the second dichroic mirror 7b, to the light modulation device 4B. The green light LG is reflected by the second dichroic mirror 7b toward the light modulation device 4G.

The first relay lens 9a is disposed between the second dichroic mirror 7b and the second total reflection mirror 8b in the light path of the blue light LB. The second relay lens 9b is disposed between the second total reflection mirror 8b and the third total reflection mirror 8c in the light path of the blue light LB.

The light modulation device 4R modulates the red light LR in accordance with image information to form image light corresponding to the red light LR. The light modulation device 4G modulates the green light LG in accordance with the image information to form image light corresponding to the green light LG. The light modulation device 4B modulates the blue light LB in accordance with the image information to form image light corresponding to the blue light LB.

As the light modulation device 4R, the light modulation device 4G, and the light modulation device 4B, there are used, for example, transmissive liquid crystal panels. Further, on the incident side and the exit side of each of the liquid crystal panels, there are respectively disposed polarization plates (not shown). Hereinafter, the light modulation device 4R, the light modulation device 4G and the light modulation device 4B are simply referred to as the light modulation devices 4R, 4G and 4B.

Further, on the incident side of the light modulation devices 4R, 4G and 4B, there are respectively disposed a field lens 10R, a field lens 10G and a field lens 10B. The field lens 10R, the field lens 10G and the field lens 10B respectively make the red light LR, the green light LG and the blue light LB entering the respective light modulation devices 4R, 4G and 4B telecentric.

The image light from each of the light modulation devices 4R, 4G and 4B enters the combining optical system 5. The combining optical system 5 combines the image light corresponding to the red light LR, the image light corresponding to the green light LG, and the image light corresponding to the blue light LB with each other, and then emits the image light thus combined toward the projection optical system 6. As the combining optical system 5, there is used, for example, a cross dichroic prism.

The projection optical system 6 is constituted by a projection lens group, and projects the image light combined by the combining optical system 5 toward the screen SCR in an enlarged manner. Thus, the color image enlarged is displayed on the screen SCR.

Light Source Device

Figure 2:
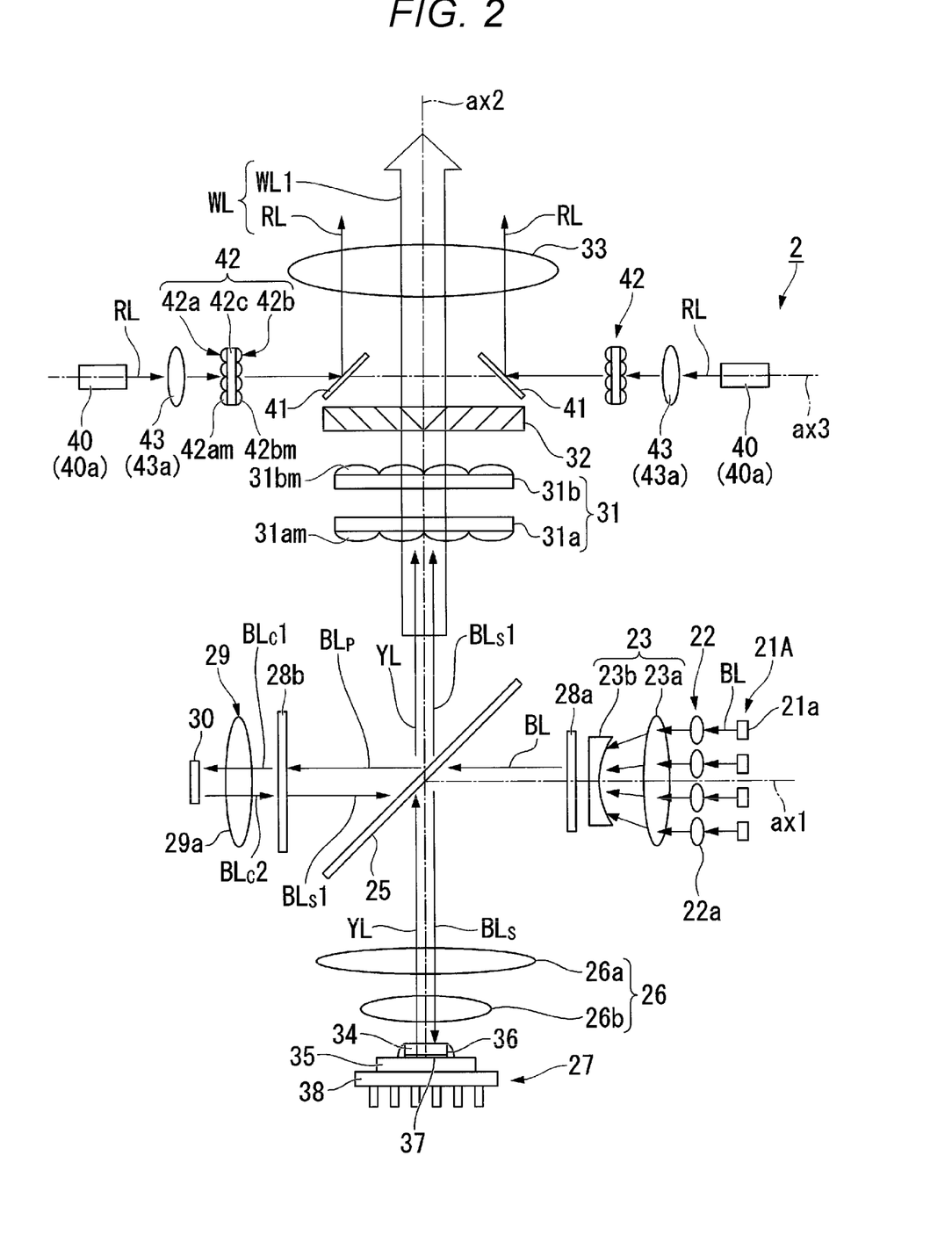
FIG. 2 is a diagram showing a schematic configuration of a light source device 2.

Then, the light source device 2 will be described. FIG. 2 is a diagram showing a schematic configuration of the light source device 2. As shown in FIG. 2, the light source device 2 is provided with a blue array light source 21A, a first collimator optical system 22, an afocal optical system 23, a first wave plate 28a, a light splitting/combining element 25, a first light collection optical system 26, a fluorescence emitting element 27, a second wave plate 28b, a second light collection optical system 29, a diffusely reflecting element 30, a first lens integrator (a first light homogenizer) 31, a polarization conversion element 32, a superimposing lens 33, a plurality of red supplementary light sources 40, mirrors 41, a plurality of second lens integrators (second light homogenizers) 42 and a plurality of second collimator optical systems 43.

The blue array light source 21A, the first collimator optical system 22, the afocal optical system 23, the first wave plate 28a, the light splitting/combining element 25, the second wave plate 28b, the second light collection optical system 29 and the diffusely reflecting element 30 are arranged in series on a light axis ax1. It should be noted that the light axis ax1 is a light axis of the blue array light source 21A.

Meanwhile, the fluorescence emitting element 27, the first light collection optical system 26, the light splitting/combining element 25, the first lens integrator 31, the polarization conversion element 32 and the superimposing lens 33 are arranged in series on an illumination light axis ax2. The light axis ax1 and the illumination light axis ax2 are located in the same plane, and are perpendicular to each other.

The blue array light source 21A is provided with a plurality of blue laser emitting elements 21a. The plurality of blue laser emitting elements 21a is arranged in an array in a plane perpendicular to the light axis ax1. The blue laser emitting elements 21a each emit, for example, a blue light beam BL (e.g., a blue laser beam in a wavelength band of 440 nm through 470 nm).

The light beams BL emitted from the blue array light source 21A enter the first collimator optical system 22. The first collimator optical system 22 converts the light beams BL emitted from the blue array light source 21A into parallel light. The collimator optical system 22 is constituted by, for example, a plurality of collimator lenses 22a arranged in an array. The collimator lenses 22a are disposed so as to correspond respectively to the blue laser emitting elements 21a.

The light beams BL having passed through the first collimator optical system 22 enter the afocal optical system 23. The afocal optical system 23 adjusts the beam diameter of the light beams BL. The afocal optical system 23 is constituted by, for example, a convex lens 23a and a concave lens 23b.

The light beams BL having passed through the afocal optical system 23 enter the first wave plate 28a. The first wave plate 28a is, for example, a half-wave plate arranged to be able to rotate. The light beams BL emitted from the blue laser emitting elements 21a are each linearly polarized light. By appropriately setting the rotational angle of the first wave plate 28a, light beams including an S-polarization component and a P-polarization component with respect to the light splitting/combining element 25 at a predetermined ratio can be obtained as the light beams BL transmitted through the first wave plate 28a. By rotating the first wave plate 28a, it is possible to change the ratio between the S-polarization component and the P-polarization component.

The light beams BL, which are generated by passing through the first wave plate 28a, and include the S-polarization component and the P-polarization component, enter the light splitting/combining element 25. The light splitting/combining element 25 is disposed so as to form an angle of 45° with the light axis ax1 and the illumination light axis ax2.

The light splitting/combining element 25 has a polarization split function of splitting each of the light beams BL into a light beam BLs as the S-polarization component with respect to the light splitting/combining element 25 and a light beam BLp as the P-polarization component. Further, the light splitting/combining element 25 has a color separation function of transmitting the fluorescence YL different in wavelength band from the light beams BL irrespective of the polarization state of the fluorescence YL. Thus, the light splitting/combining element 25 functions as a combining unit for combining an S-polarization component (the light beams BLs) as a part of the light beams BL and the fluorescence YL with each other as described later.

Specifically, the light splitting/combining element 25 reflects the light beams BLs as the S-polarization component, and transmits the light beams BLp as the P-polarization component. The light beams BLs as the S-polarized light having been emitted from the light splitting/combining element 25 enter the first light collection optical system 26. The first light collection optical system 26 converges the light beams BLs toward the phosphor 34.

In the present embodiment, the first light collection optical system 26 is constituted by, for example, a first lens 26a and a second lens 26b. The light beams BLs having been emitted from the first light collection optical system 26 enter the fluorescence emitting element 27 in a converged state. The fluorescence emitting element 27 has the phosphor 34, a substrate 35 for supporting the phosphor 34, and a fixation member 36 for fixing the phosphor 34 to the substrate 35.

In the present embodiment, the phosphor 34 is fixed to the substrate 35 with the fixation member 36 disposed between a side surface of the phosphor 34 and the substrate 35. The phosphor 34 has contact with the substrate 35 in a surface on an opposite side to the side which the light beams BLs enter.

The phosphor layer 34 includes a phosphor which absorbs the light beams BLs to thereby be excited. The phosphor excited by the light beams BLs emits the fluorescence (the yellow fluorescence) YL in the wavelength band of, for example, 500 through 700 nm.

On the opposite side of the phosphor 34 to the side which the light beams BLs enter (on the opposite side to the first light collection optical system 26), there is disposed a reflecting section 37. The reflecting section 37 reflects a component proceeding toward the substrate 35 out of the fluorescence YL generated by the phosphor 34.

On a surface of the substrate 35 on the opposite side to the surface for supporting the phosphor 34, there is disposed a heatsink 38. In the fluorescence emitting element 27, since heat radiation can be achieved through the heatsink 38, the heat deterioration of the phosphor 34 can be prevented.

A part of the fluorescence YL generated by the phosphor 34 is reflected by the reflecting section 37, and is then emitted to the outside of the phosphor 34. Further, another part of the fluorescence YL generated by the phosphor 34 is emitted to the outside of the phosphor 34 without the intervention of the reflecting section 37. In such a manner as described above, the fluorescence YL is emitted from the phosphor 34.

The fluorescence YL emitted from the phosphor 34 is non-polarized light. The fluorescence YL passes through the first light collection optical system 26, and then enters the light splitting/combining element 25. Then the fluorescence YL proceeds from the light splitting/combining element 25 toward the first lens integrator 31.

Meanwhile, the light beams BLp as the P-polarized light having been emitted from the light splitting/combining element 25 enter the second wave plate 28b. The second wave plate 28b is formed of a quarter-wave plate disposed in the light path between the light splitting/combining element 25 and the diffusely reflecting element 30. Therefore, the light beams BLp as the P-polarized light having been emitted from the light splitting/combining element 25 are converted by the second wave plate 28b into, for example, blue light BLc1 as clockwise circularly polarized light, and then enter the second light collection optical system 29.

The second light collection optical system 29 is formed of, for example, a lens 29a, and makes the blue light BLc1 enter the diffusely reflecting element 30 in a converged state.

The diffusely reflecting element 30 is disposed at the opposite side to the phosphor 34 in the light splitting/combining element 25, and diffusely reflects the blue light BLc1, which has been emitted from the second light collection optical system 29, toward the light splitting/combining element 25. As the diffusely reflecting element 30, it is preferable to use an element which causes the Lambertian reflection of the blue light BLc1, and at the same time does not disturb the polarization state. It should be noted that it is also possible to adopt a configuration of rotating a diffusely reflecting plate shaped like a circular disk as the diffusely reflecting element 30.

Hereinafter, the light diffusely reflected by the diffusely reflecting element 30 is referred to as blue light BLc2. According to the present embodiment, by diffusely reflecting the blue light BLc1, there can be obtained the blue light BLc2 having a roughly homogenous illuminance distribution. For example, the blue light BLc1 as the clockwise circularly polarized light is reflected as the blue light BLc2 as counterclockwise circularly polarized light. The blue light BLc2 is converted by the second light collection optical system 29 into parallel light, and then enters the second wave plate 28b once again.

The blue light BLc2 as the counterclockwise circularly polarized light is converted by the second wave plate 28b into blue light BLs1 as S-polarized light. The blue light BLs1 as the S-polarized light is reflected by the light splitting/combining element 25 toward the first lens integrator 31.

As described above, the blue light BLs1 and the fluorescence YL are emitted from the light splitting/combining element 25 toward the same direction. Therefore, the blue light BLs1 and the fluorescence YL are combined with each other by the light splitting/combining element 25 to generate the white composite light WL1.

The composite light WL1 is emitted toward the first lens integrator 31. The first lens integrator 31 has a first multi-lens 31a and a second multi-lens 31b. The first multi-lens 31a has a plurality of first small lenses 31am for dividing the composite light WL1 (the fluorescence YL and the blue light beams BLs1) into a plurality of partial light beams.

The lens surface (the surface of the first small lenses 31am) of the first multi-lens 31a and the image formation area of each of the light modulation devices 4R, 4G and 4B are conjugated with each other. Therefore, the shape of each of the first small lenses 31am is a roughly similar shape (a rectangular shape) to the shape of each of the image formation areas of the light modulation devices 4R, 4G and 4B. Thus, each of the partial light beams emitted from the first multi-lens 31a efficiently enters each of the image formation areas of the light modulation devices 4R, 4G and 4B.

The second multi-lens 31b has a plurality of second small lenses 31bm corresponding respectively to the first small lenses 31am of the first multi-lens 31a. The second multi-lens 31b forms an image of each of the first small lenses 31am of the first multi-lens 31a in the vicinity of each of the image formation areas of the respective light modulation devices 4R, 4G and 4B in cooperation with the superimposing lens 33.

The composite light WL1 having been transmitted through the first lens integrator 31 enters the polarization conversion element 32. The polarization conversion element 32 is constituted by polarization split films and wave plates (half-wave plates) arranged in an array. The polarization conversion element 32 has a light emission area 32a for converting the composite light WL1 including the fluorescence YL as the non-polarized light into linearly polarized light, and then emitting the linearly polarized light. In the present embodiment, the planar shape of the light emission area 32a is a rectangular shape.

The polarization conversion element 32 converts the polarization direction of the composite light WL1 into a predetermined direction. More specifically, the polarization conversion element 32 makes the polarization direction of the composite light WL1 correspond to the direction of the transmission axis of a polarization plate (not shown) disposed at the light incident side of each of the light modulation devices 4R, 4G and 4B. Thus, the polarization direction of the red light LR, the green light LG and the blue light LB obtained by splitting the composite light WL1 as described above corresponds to the transmission axis direction of the incident side polarization plate of each of the light modulation devices 4R, 4G and 4B. Therefore, the red light LR, the green light LG and the blue light LB are respectively guided to the image formation areas of the light modulation devices 4R, 4G and 4B in good condition without being blocked by the incident side polarization plates, respectively.

The composite light WL1 having been transmitted through the polarization conversion element 32 enters the superimposing lens 33. The superimposing lens 33 homogenizes the illuminance distribution due to the composite light WL1 in the area to be illuminated in cooperation with the first lens integrator 31.

Incidentally, in order to realize the white light of 6500 K with the composite light WL1, the red component is insufficient. Therefore, it is conceivable to increase the output of the light beams BL emitted from the blue array light source 21A to thereby increase the red component included in the fluorescence YL. However, in this case, since the components (the blue component and the green component) other than the red component become superfluous, the light loss occurs as a result.

In contrast, it is possible for the light source device 2 according to the present embodiment to generate the illumination light WL in which the red component is supplemented by a plurality of (e.g., four) red supplementary light sources 40. The red supplementary light sources 40 are each provided with a red laser emitting element 40a. The red laser emitting elements 40a each emit, for example, a red supplementary light beam RL (e.g., a red laser beam with a peak wavelength in a range of 630 through 650 nm). In the present embodiment, since the two or more red supplementary light sources 40 are provided in order to supplement the insufficient red component, it is possible to suppress the output of the supplementary light beam RL emitted from each of the red supplementary light sources 40 to the extent that the speckle becomes inconspicuous.

It should be noted that the supplementary light beam RL emitted from the red laser emitting element 40a is linearly polarized light, and the polarization direction thereof is the same as the polarization direction of the composite light WL1 transmitted through the polarization conversion element 32.

The supplementary light beam RL emitted from each of the red supplementary light sources 40 enters corresponding one of the second collimator optical system 43. The second collimator optical system 43 converts the supplementary light beam RL emitted from the red supplementary light source 40 into parallel light. The second collimator optical system 43 is formed of a single collimator lens 43a.

The supplementary light beam RL collimated by the second collimator optical system 43 enters corresponding one of the second lens integrators 42. The second lens integrators 42 each have a transparent substrate 42c, a third multi-lens 42a disposed at one surface side of the transparent substrate 42c, and a fourth multi-lens 42b disposed at the other surface side of the transparent substrate 42c. In other words, the second lens integrators 42 of the present embodiment each have the third multi-lens 42a and the fourth multi-lens 42b formed integrally with each other. Thus, the second lens integrators 42 are reduced in size.

The third multi-lens 42a has a plurality of third small lenses 42am which is formed on the plane-of-incidence-of-light side of the transparent substrate 42c, and divides the supplementary light beam RL emitted from the red supplementary light source 40 into a plurality of partial light beams.

The supplementary light beam RL having been transmitted through the second lens integrator 42 enters corresponding one of the mirrors 41. In the present embodiment, each of the mirrors 41 is disposed at the light emission side of the polarization conversion element 32, namely between the superimposing lens 33 and the polarization conversion element 32. Each of the mirrors 41 is disposed so as to form an angle of 45° with a light axis ax3 of the red supplementary light source 40 for emitting the supplementary light beam RL.

Figure 3:
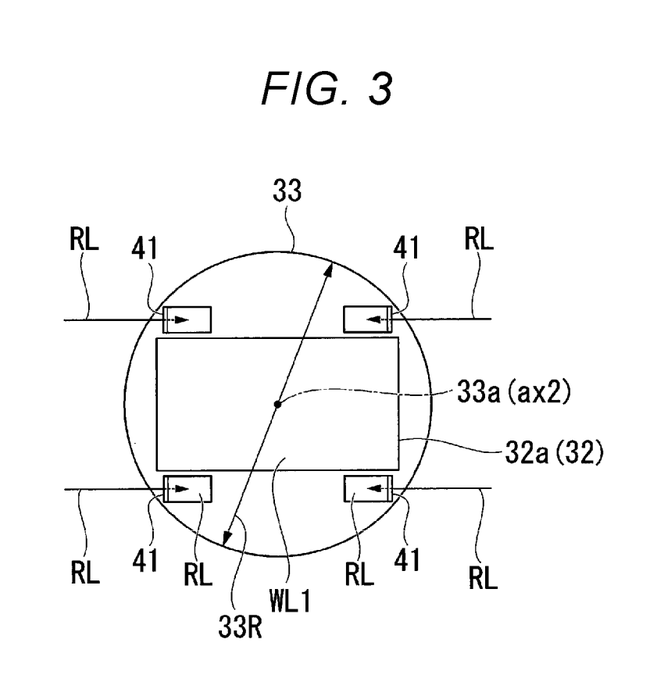
FIG. 3 is a front view showing an arrangement of mirrors in a superimposing lens 33.

FIG. 3 is a front view showing an arrangement of the mirrors with respect to the superimposing lens 33.

As shown in FIG. 3, the superimposing lens 33 has a circular shape. The superimposing lens 33 is made larger in effective diameter 33R of the lens than the light emission area 32a having a rectangular shape, and thus efficiently "swallows" the composite light WL1 having been transmitted through the polarization conversion element 32. Here, the size of the light emission area 32a is roughly the same as the outer shape of the polarization conversion element 32 in the state of a planar view of the polarization conversion element 32 in the illumination light axis ax2 direction.

In the present embodiment, the four mirrors 41 are disposed inside the effective diameter 33R of the superimposing lens 33 and outside the light emission area 32a. More specifically, the four mirrors 41 are disposed in vacant spaces (spaces where no light enters) in a vertical direction of the superimposing lens 33 shown in FIG. 3. The four mirrors 41 are disposed at positions axisymmetrical about an optical axis 33a of the superimposing lens 33.

Specifically, the mirrors 41 are disposed at positions not overlapping the composite light WL1 emitted from the polarization conversion element 32. Therefore, since the mirror 41 is not located on the light path of the composite light WL1, the composite light WL1 has no chance of entering the mirror 41. Therefore, the mirror 41 has no chance of reflecting the composite light WL1, and thus, the occurrence of the loss in the composite light WL1 is reduced.

Each of the mirrors 41 reflects the supplementary light beam RL toward the superimposing lens 33. Thus, the supplementary light beams RL and the composite light WL1 enter the superimposing lens 33. In the superimposing lens 33, the supplementary light beams RL and the composite light WL1 are combined with each other to generate the illumination light WL as white light.

The supplementary light beam RL reflected by each of the mirrors 41 enters a peripheral area (an area which the composite light WL1 does not enter) of the superimposing lens 33. In other words, the supplementary light beams RL enter the positions distant from the optical axis of the superimposing lens 33. Therefore, when the supplementary light beams RL are transmitted through the superimposing lens 33, a component apt to be affected by aberration, namely a component entering the image formation area of the light modulation device 4R from an oblique direction, increases. Therefore, the superimposing performance on the area to be illuminated in the supplementary light beams RL is apt to deteriorate.

In contrast, in the light source device 2 according to the present embodiment, the division number of the lenses in the second lens integrator 42 is set, for example, three times or four times as large as the division number of the lenses in the first lens integrator 31. In other words, the number of the third small lenses 42am in the third multi-lens 42a is larger than the number of the first small lenses 31am in the first multi-lens 31a. Therefore, the second lens integrator 42 is made to have a higher superimposing performance than that of the first lens integrator 31. Therefore, since the area to be illuminated is irradiated with the supplementary light beams RL via the second lens integrator 42 high in superimposing performance, the influence of the aberration described above decreases.

Further, in the present embodiment, since the mirrors 41 are respectively disposed at the positions axisymmetrical about the optical axis 33a of the superimposing lens 33, the supplementary light beams RL are made to enter the image formation area of the light modulation device 4R from axisymmetrical directions. Thus, it is possible to improve the homogeneity of the illuminance distribution on the image formation area of the light modulation device 4R.

Going back to FIG. 2, the lens surface (the surfaces of the third small lenses 42am) of the third multi-lens 42a and the lens surface (the surfaces of the first small lenses 31am) of the first multi-lens 31a are conjugated with each other. Therefore, the shape of each of the third small lenses 42am is made roughly similar to the shape of each of the first small lenses 31am.

Since the shape of each of the first small lenses 31am is a roughly similar shape (a rectangular shape) to the shape of each of the image formation areas of the light modulation devices 4R, 4G and 4B as described above, the shape of the third small lens 42am also becomes a rectangular shape. Therefore, each of the partial light beams of the supplementary light beam RL emitted from the third multi-lens 42a efficiently enters the image formation area of the light modulation device 4R as the red light LR.

In the present embodiment, the polarization direction of the supplementary light beam RL is the same as that of the composite light WL1 having been transmitted through the polarization conversion element 32. Therefore, the supplementary light beam RL is efficiently guided to the image formation area of the light modulation device 4R without being blocked by the incident side polarization plate similarly to the red component included in the composite light WL1.

The fourth multi-lens 42b has a plurality of fourth small lenses 42bm which is formed on the light exit surface side of the transparent substrate 42c, and corresponds respectively to the third small lenses 42am of the third multi-lens 42a. The fourth multi-lens 42b forms an image of the supplementary light beam RL of each of the third small lenses 42am of the third multi-lens 42a in the vicinity of the image formation areas of the light modulation devices 4R in cooperation with the superimposing lens 33.

As described above, according to the light source device 2 of the present embodiment, since the mirrors 41 are disposed at the positions not overlapping the composite light WL1 emitted from the light emission area 32a of the polarization conversion element 32, it is possible to supplement the red component of the illumination light WL while reducing the occurrence of the light loss. Therefore, it is possible to generate the illumination light WL having the optimum white balance.

Further, in the light source device 2 according to the present embodiment, since there are provided the second lens integrators 42 each disposed between the red supplementary light source 40 and the mirror 41, it is possible to uniformly irradiate the image formation area of the light modulation device 4R with the supplementary light beams RL.

Further, in the light source device 2 according to the present embodiment, since the first small lenses 31am constituting the first multi-lens 31a and the third small lenses 42am constituting the third multi-lens 42a are similar in shape to each other, it is possible to make the partial light beams emitted from the first small lenses 31am and the third small lenses 42am efficiently enter the same area to be illuminated (the image formation area of the light modulation device 4R).

Further, in the light source device 2 according to the present embodiment, since the division number (the number of the third small lenses 42am) of the lenses in the third multi-lens 42a is made larger than the division number (the number of the first small lenses 31am) of the lenses in the first multi-lens 31a, it is possible to make the second lens integrator 42 higher in superimposing performance than the first lens integrator 31. Thus, it is possible to reduce the influence of the aberration to the supplementary light beams RL entering the peripheral area of the superimposing lens 33 to thereby uniformly illuminate the image formation area of the light modulation device 4R with the supplementary light beams RL.

Further, according to the projector 1 of the present embodiment, since the light source device 2 described above is provided, it is possible to display an image which is bright due to the high light use efficiency, and therefore good in quality.

It should be noted that the present disclosure is not limited to the contents of the embodiment described above, but can arbitrarily be modified within the scope or the spirit of the present disclosure.

For example, in the embodiment described above, there is cited the case in which the four red supplementary light sources 40 are provided as an example, but the number of the red supplementary light sources 40 is not limited to this example. For example, in the case in which the necessary amount of supplement for the red light is small, it is possible to provide just a single red supplementary light source 40.

Further, although the case of using the lens integrators as the first light homogenizer and the second light homogenizers is cited as an example in the embodiment described above, it is also possible to adopt a configuration of using rod lenses as the first light homogenizer and the second light homogenizers.

Further, although in the embodiment described above, there is described the example of installing the light source device according to the present disclosure in the projector, this is not a limitation. The light source device according to the present disclosure can also be applied to lighting equipment, a headlight of a vehicle, and so on.

What is claimed is:

1. A light source device comprising:
   a blue laser emitting element configured to emit a blue laser beam;
   a red laser emitting element configured to emit a red laser beam;
   a phosphor excited by the blue laser beam to generate yellow fluorescence;
   a combiner configured to combine the yellow fluorescence and a part of the blue laser beam with each other to generate composite light;
   a polarization conversion element disposed in a posterior stage of the combiner; and
   a mirror disposed at a light emission side of the polarization conversion element to reflect the red laser beam, wherein
   the mirror is located at a position failing to overlap the composite light emitted from the polarization conversion element.

2. The light source device according to claim 1, further comprising:
   a first light homogenizer disposed between the combiner and the polarization conversion element; and
   a superimposing lens disposed at the light emission side of the polarization conversion element, wherein
   the mirror is disposed between the superimposing lens and the polarization conversion element, and
   the red laser beam reflected by the mirror and the composite light enter the superimposing lens.

3. The light source device according to claim 2, further comprising:
   a second light homogenizer disposed between the red laser emitting element and the mirror.

4. The light source device according to claim 3, wherein
   the first light homogenizer has a first lens integrator,
   the second light homogenizer has a second lens integrator,
   the first lens integrator has a first multi-lens and a second multi-lens,
   the second lens integrator has a third multi-lens and a fourth multi-lens, and
   a first small lens constituting the first multi-lens and a third small lens constituting the third multi-lens are similar in shape to each other.

5. The light source device according to claim 4, wherein
   a division number of lenses in the second lens integrator is larger than a division number of lenses in the first lens integrator.

6. The light source device according to claim 1, wherein
   the polarization conversion element has a light emission area configured to convert the composite light into polarized light in a predetermined direction and emit the polarized light, and
   the mirror is disposed outside the light emission area in a state of a planar view of the polarization conversion element from a light axis direction.

7. The light source device according to claim 2, wherein
   the polarization conversion element has a light emission area configured to convert the composite light into polarized light in a predetermined direction and emit the polarized light, and
   the mirror is disposed outside the light emission area in a state of a planar view of the polarization conversion element from a light axis direction.

8. The light source device according to claim 3, wherein
   the polarization conversion element has a light emission area configured to convert the composite light into polarized light in a predetermined direction and emit the polarized light, and
   the mirror is disposed outside the light emission area in a state of a planar view of the polarization conversion element from a light axis direction.

9. The light source device according to claim 4, wherein
   the polarization conversion element has a light emission area configured to convert the composite light into polarized light in a predetermined direction and emit the polarized light, and
   the mirror is disposed outside the light emission area in a state of a planar view of the polarization conversion element from a light axis direction.

10. The light source device according to claim 5, wherein
    the polarization conversion element has a light emission area configured to convert the composite light into polarized light in a predetermined direction and emit the polarized light, and
    the mirror is disposed outside the light emission area in a state of a planar view of the polarization conversion element from a light axis direction.

11. A projector comprising:
    the light source device according to claim 1;
    a light modulation device configured to modulate light from the light source device in accordance with image information to thereby form image light; and
    a projection optical system configured to project the image light.

12. A projector comprising:
    the light source device according to claim 2;
    a light modulation device configured to modulate light from the light source device in accordance with image information to thereby form image light; and
    a projection optical system configured to project the image light.

13. A projector comprising:
    the light source device according to claim 3;
    a light modulation device configured to modulate light from the light source device in accordance with image information to thereby form image light; and
    a projection optical system configured to project the image light.

14. A projector comprising:
    the light source device according to claim 4;
    a light modulation device configured to modulate light from the light source device in accordance with image information to thereby form image light; and
    a projection optical system configured to project the image light.

15. A projector comprising:
    the light source device according to claim 5;
    a light modulation device configured to modulate light from the light source device in accordance with image information to thereby form image light; and
    a projection optical system configured to project the image light.

16. A projector comprising:
    the light source device according to claim 6;
    a light modulation device configured to modulate light from the light source device in accordance with image information to thereby form image light; and
    a projection optical system configured to project the image light.

17. A projector comprising:
the light source device according to claim 7;
a light modulation device configured to modulate light from the light source device in accordance with image information to thereby form image light; and
a projection optical system configured to project the image light.

18. A projector comprising:
the light source device according to claim 8;
a light modulation device configured to modulate light from the light source device in accordance with image information to thereby form image light; and
a projection optical system configured to project the image light.

19. A projector comprising:
the light source device according to claim 9;
a light modulation device configured to modulate light from the light source device in accordance with image information to thereby form image light; and
a projection optical system configured to project the image light.

20. A projector comprising:
the light source device according to claim 10;
a light modulation device configured to modulate light from the light source device in accordance with image information to thereby form image light; and
a projection optical system configured to project the image light.

\* \* \* \* \*